Figure 1:
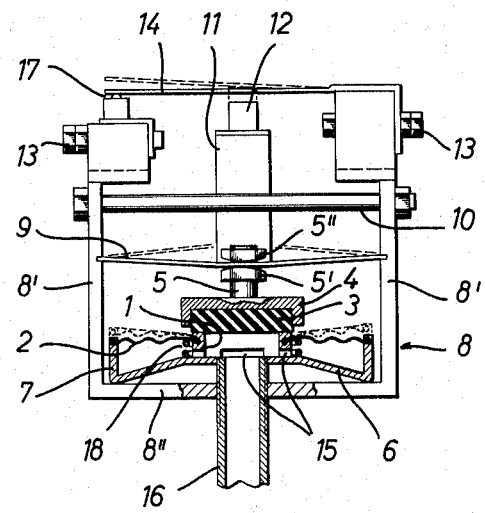

June 21, 1966  W. BRANDL  3,257,521

PRESSURE CONTROL VALVE

Filed July 3, 1964

INVENTOR
WILLI BRANDL

BY Dicke + Craig
ATTORNEYS

United States Patent Office 3,257,521
Patented June 21, 1966

3,257,521
PRESSURE CONTROL VALVE
Willi Brandl, 12 Schurbungert, Zurich, Switzerland
Filed July 3, 1964, Ser. No. 380,186
Claims priority, application Germany, July 3, 1963,
B 72,524
8 Claims. (Cl. 200—61.86)

The present invention relates to a pressure control and safety valve which is provided with a valve member which is normally held on a valve seat by an adjustable spring pressure.

It is an object of the invention to provide a pressure control valve of the above-mentioned type which is designed so as to open suddenly and completely when the pressure of a pressure medium to which the valve is subjected reaches a certain predetermined value and then to release the pressure without a pressure rise, and in which the valve seat and the size of the valve port are no larger than necessary for discharging the pressure medium or for releasing the pressure.

According to the invention this object is attained by providing a valve member in the form of a ring, the upper edge of which forms an annular valve seat and by securing this ring to the edge of a central opening in a diaphragm which is secured at its outer peripheral edge to the upper edge of the wall of a housing in which the pressure medium may act upon the lower side of the diaphragm. The force of the pressure medium is then transmitted by the diaphragm and the smaller valve seat thereon at an increased strength to a valve gasket covering the valve seat which is thereby pressed against a cup-shaped socket in which the gasket is mounted. The other side of this socket carries a central projection which is secured to the center of a leaf spring which, in turn, is secured at its outer ends to the two arms of a U-shaped bracket whcih is removably connected to the diaphragm housing. By means of a tension rod or the like it is possible to adjust the distance between the two arms of the bracket and thereby to exert an adjustable pressure in the axial direction upon the opposite ends of the leaf spring. By this pressure the leaf spring is given a certain but adjustable initial tension which determines the release pressure of the valve, that is, the pressure at which the valve opens when the pressure of the pressure medium reaches a certain value. When the valve is in its normal or inactive position, the leaf spring is bent centrally in the downward direction and by means of its initial tension it presses the gasket tightly upon the valve seat on the mentioned ring which is thereby pressed upon the bottom of the diaphragm housing. When the pressure acting upon the lower side of the diaphragm increases beyond a certain value, the diaphragm is pressed upwardly and the considerably smaller valve seat thereon is then pressed at an increased force against the gasket which, in turn, presses through its socket against the leaf spring and moves it against its initial tension to a point near its straight position. If the pressure acting upon the diaphragm finally reaches the critical point, the leaf spring suddenly snaps toward its other side in which it is bent upwardly and thereby quickly separates the gasket from the valve seat so that the excess pressure is released and the diaphragm also immediately returns to its original position. By this return the ring forming the valve seat member again engages with the bottom of the diaphragm housing so that the size of the valve opening between this ring and the valve gasket is further increased.

According to the invention, it has further been found that, in order to insure a proper operation of the valve it is necessary to make the inner diameter of the valve seat member of a size equal to or greater than the inner diameter of the opening through which the pressure medium enters the valve.

Another feature of the invention consists in providing the lower end of the annular valve seat member which normally engages with the bottom of the diaphragm housing with bores or slots to serve as ports for the passage of the pressure into the housing so as to act upon the lower side of the diaphragm.

A further feature of the invention consists in employing the new pressure control valve and the snap action of its leaf spring for the additional purpose of operating a further control device simultaneously with the actuation of the valve, for example, an electric switch for interrupting a heating circuit of the apparatus to which the safety valve is connected.

Another very important advantage of the invention is the fact that either by the exchange of the diaphragm for one of a slightly different shape and/or by a suitable adjustment of the valve elements and especially the leaf spring, it is possible to employ the new safety valve either for controlling pressures higher than atmospheric or pressures lower than atmospheric. In this manner the new safety valve may be easily adjusted for releasing any predetermined pressures within pressure ranges extending from 0.2 to 10 atm. and more.

Figure 2:
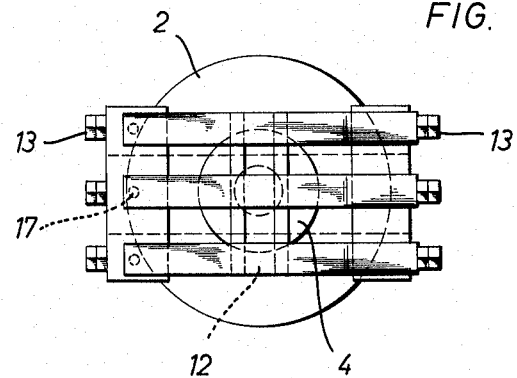

The above-mentioned as well as still further features and advantages of the present invention will become more clearly apparent from the following detailed description thereof which is to be read with reference to the accompanying drawings, in which FIGURE 1 shows a vertical section of the pressure control valve according to the invention in combination with an electric switch; while FIGURE 2 shows a top view of the valve according to FIGURE 1 which may also serve as a three-pole switch.

As illustrated particularly in FIGURE 1, the pressure control and safety valve according to the invention consists essentially of a leaf spring 9, the outer edges of which are secured to the two arms 8' of a U-shaped bracket 8. The central web 8" of this bracket carries a diaphragm housing 7 which is secured thereto in any suitable manner and preferably so as to be removable from the bracket 8. For example, web 8" may be provided with a central tapped bore through which the threaded end portion of the inlet pipe 16 may be screwed, and the open end of this pipe may be screwed or soldered airtight into a central aperture in the bottom 6 of the diaphragm housing. At its center, leaf spring 9 carries a rod 5 which is removably and adjustably connected to spring 9 by means of a pair of nuts 5' and 5" which for a reason as subsequently described preferably have a rounded shape at their sides facing the leaf spring. At its lower end rod 5 is rigidly secured to a cup-shaped socket 4 in which a valve gasket 3 is mounted. By means of a crossbar 10 or the like which permits the arms 8' of bracket 8 to be adjusted to different distances from each other, it is possible to give the leaf spring 9 an initial tension which corresponds to a predetermined pressure, the so-called release pressure, at which the value should open automatically. By this initial tension, spring 9 is bent centrally in the downward direction when the valve is in the inactive position and it presses the gasket 3 securely upon an annular valve seat which forms the upper end of a ring 1 which, in turn, is thereby pressed upon the bottom of the diaphragm housing 7. This ring-shaped valve seat member 1 is secured to the edge of a central opening in a diaphragm 2 which is secured at its outer peripheral edge to the upper edge of the housing 7 and closes this housing toward the outside. At or adjacent to its lower end, the valve seat member 1 is further provided with round or slot-shaped ports 15 through which the pressure medium coming through the inlet pipe 16 from the apparatus or pressure line to be controlled may pass into the diaphragm housing 7 to act upon the lower side of the diaphragm 2.

The upper ends of the arms 8' of bracket 8 may be additionally provided with electrical connections 13 and contacts 17 and with a safety switch 14 which is associated with these electrical contacts and connections and may form a one-pole or two-pole switch or even a three-pole switch, as indicated in FIGURE 2. This safety switch 14 may be actuated by an insulated buffer 12 on the upper free end of a bracket, rod, or the like 11 which may be secured to the upper side of the leaf spring 9, for example, by the nut 5". Thus, when the leaf spring 9 snaps upwardly in the manner as subsequently described, buffer 12 hits against the lower side of the switch elements 14 and thereby severs them abruptly from the contacts 17 so that, for example, an electric heating device of the apparatus to be protected will be switched off at the same time when the safety valve is opened to release the excess pressure.

Since the pressure which is caused by the initial tension of leaf spring 9 in the inactive position of the valve, as shown in full lines in FIGURE 1, is sufficient to press the gasket 3 tightly upon the annular valve seat 1, and since this valve seat has a relatively small diameter, the gasket 3 may consist of a relatively hard material which does not have a tendency to stick.

The mode of operation of the pressure control valve according to the invention is as follows:

If the normal pressure of the pressure medium to be controlled is substantially atmospheric or higher, the diaphragm 2 is normally in a substantially horizontal position, as indicated in FIGURE 1 in full lines. The valve gasket 3 then engages upon the valve seat member 1 and the latter upon the bottom 6 of the diaphragm housing 7 with a pressure which at least corresponds to the normal pressure of the pressure medium in pipe 16 and housing 7 and is produced by a suitable adjustment of the initial tension of leaf spring 9 by the tension rod 10 on the bracket arms 8'. In view of the fact that the surface area of diaphragm 2 is much larger than the cross-sectional size of the valve seat member 1, even a very slight upward movement of diaphragm 2 as the result of an increase in pressure in the diaphragm housing 7 will be transmitted at an increased force by the valve seat ring 1 to the valve gasket 3 and through the latter to the leaf spring 9 to bend the same upwardly against its spring force toward a substantially straight horizontal position. If the pressure of the pressure medium in pipe 16 and the diaphragm housing 7 increases to the critical value to which the leaf spring 9 is adjusted, the initial tension of the latter will be overcome and the spring will suddenly snap beyond its straight position to the other side as indicated in FIGURE 1 in dotted lines. By this movement the valve gasket 3 is suddenly pulled off the valve seat 1 and the valve is thus opened so that the excess pressure coming through pipe 16 and also that in the diaphragm housing 7 will be released to the outside. This pressure release occurs very quickly due to the fact that, even though the distance of this snapping movement of leaf spring 9 is relatively small, it produces a much larger valve opening since simultaneously with the release of the pressure from the diaphragm housing 7, the diaphragm 2 snaps immediately back to its original, substantially horizontal position in which the valve seat member 1 again engages upon the bottom 6 of housing 7. The valve gasket 3 is therefore lifted off the valve seat 1 for a distance which is substantially equal to twice the distance of the actual snapping movement of leaf spring 9.

Due to the increase in force caused by the difference in size between the diaphragm 2 and the valve seat ring 1, it is also possible by a suitable adjustment of the leaf spring 9 to employ the new safety valve for limiting pressures of less than one atmosphere. The reduced pressure which then prevails in the diaphragm housing 7 then acts upon the diaphragm 2 to hold the valve seat ring 1 in engagement with the bottom 6 of the housing 7. If the safety valve is to be used for controlling pressures below atmospheric, it may in some cases be advisable either to make the outer wall of the diaphragm housing 7 slightly higher or to reduce the thickness of the ring 1 so that, when this ring 1 engages with the bottom of the housing 7, the diaphragm will be bent slightly downwardly from its straight horizontal position. Consequently, when the negative pressure in pipe 16 and diaphragm housing 7 rises toward the point at which the safety valve should open, diaphragm 2 is released to its horizontal position and thereby lifts the valve seat ring 1 off the bottom of the diaphragm housing 7. As the result of this movement, the valve seat ring 1 lifts the gasket 3 and thereby tightens the leaf spring by bending it toward its horizontal position. When the negative pressure in the diaphragm housing 7 rises to the critical value, leaf spring 9 will snap suddenly over to the other side and thereby pull the gasket 3 off the valve seat ring 1.

Although for adjusting the safety valve so as to release pressures either above or below atmospheric, it is usually only necessary to adjust the tension of the leaf spring 9 by an adjustment of the tension rod 10, it is possible to vary the sensitivity of the valve as well as the pressure range which is to be controlled also by making the valve elements of different materials or dimensions, for example, by providing the valve with a leaf spring or a diaphragm of a different inherent resilience. In some cases it is also advisable to provide a coil spring 18 in the diaphragm housing 7 between the diaphragm 2 and the bottom 6 of the housing. Since this coil spring 18, as indicated in FIGURE 1 in dotted lines, presses the diaphragm 2 in the upward direction so as to press the valve seat ring 1 more firmly against the gasket 3, it is necessary to increase the tension of the leaf spring 9 in order to compensate for the additional force of the coil spring 18. Such an additional spring 18 or in place of it the provision of a resilient diaphragm 2 with an initial tension in the upward direction is of advantage particularly when the safety valve is employed for controlling pressures below atmospheric and it permits the valve to be very accurately adjusted to a particular release pressure. The sensitivity of the valve may also be varied, for example, by varying the distance between the lower surface of the valve gasket 3 and the leaf spring 9 either by the insertion of a gasket of a different thickness into the socket 4 or by adjusting the nuts 5' and 5" on the stem 5 so that the gasket will be in sealing engagement with the valve seat when the leaf spring is bent downwardly for only a very small distance from its horizontal position.

The snap action of leaf spring 9 also has the advantage that it will also pull a gasket quickly off the valve seat even though because of long use this gasket has the tendency to stick to the valve seat. In order to make this snap action still more effective, it is advisable to provide a small play between the nuts 5' and 5" and the leaf spring 9 or more preferably and as shown in FIGURE 1, to make the sides of the nuts 5' and 5" facing the leaf spring 9 of a rounded shape. This enables the spring at first to snap upwardly without being held back by a possible sticking of the gasket 3 on the valve seat. Due to its strength and its length as compared with the size of the valve seat, the leaf spring 9 has a very strong lifting force which insures that the valve will always open automatically when the pressure to be supervised exceeds the value to which the valve is adjusted.

In order to prevent the diaphragm from bending upwardly more than necessary, it is advisable to provide a stop member, not shown, which should be mounted in such a position that it will not become effective until the leaf spring has passed beyond its snap point. This stop member may also be provided in the form of a sharp-pointed element which is adapted to pierce the diaphragm if it is bent upwardly excessively. This pointed element should, however, become effective only if the gasket should stick so tightly to the valve seat that even the snap action of the leaf spring will not sever it therefrom.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A pressure control valve comprising a cup-shaped container having an outer wall and a bottom, and a central inlet port in said bottom adapted to be connected to a source of pressure to be controlled by said valve, a diaphragm secured at its outer edge to the free end of said container wall and having a central aperture, a ring-shaped first valve member within said aperture and secured to the inner edge of said diaphragm defining said aperture, one end of said first valve member on the outer side of said diaphragm forming an annular valve seat and the other end of said first valve member normally adapted to engage upon the bottom of said container, the wall of said valve member having at least one port for connecting the inside of said container with said source, a second valve member operatively associated with said first valve member and normally engaging with and covering said valve seat and thereby closing said container toward the atmosphere, and means for normally maintaining said second valve member in closing engagement with said valve seat on said first valve member and for suddenly lifting said second valve member off said valve seat when the pressure of said source and in said container increases to a critical value, said means comprising a leaf spring, means for centrally securing said second valve member to said leaf spring, means for securing the ends of said leaf spring in a fixed position relative to said container, and pressure means for exerting a pressure at least upon one end of said leaf spring in the direction toward the other end so as normally to bend said spring centrally between said ends in the direction toward said valve seat and thereby to press said second valve member upon said valve seat to close the same with a pressure at least slightly greater than the normal pressure value of said source so that, when the pressure of said source increases above said normal value, said diaphragm and said first valve member thereon are moved by said increased pressure in the direction away from said container bottom and in turn move the second valve member and bend said leaf spring in the same direction toward its substantially straight position from which when said pressure of said source further increases and reaches said critical value, said leaf spring then suddenly snaps of its own accord in the same direction toward its released position and thereby pulls said second valve member off said valve seat.

2. A pressure control valve as defined in claim 1, further comprising means for varying the pressure exerted by said pressure means upon said leaf spring.

3. A pressure control valve comprising a cup-shaped container having an outer wall and a bottom and a central inlet port in said bottom adapted to be connected to a source of pressure to be controlled by said valve, a diaphragm secured at its outer edge to the free end of said container wall and having a central aperture, a ring-shaped first valve member within said aperture and secured to the inner edge of said diaphragm defining said aperture, one end of said first valve member on the outer side of said diaphragm forming an annular valve seat having an inner diameter at least equal to the diameter of said inlet port, the other end of said first valve member normally adapted to engage upon the bottom of said container, the wall of said valve member having at least one port for connecting the inside of said container with said inlet port, a second valve member operatively associated with said first valve member and normally engaging with and covering said valve seat and thereby closing said container toward the atmosphere, and means for normally maintaining said second valve member in closing engagement with said valve seat on said first valve member and for suddenly lifting said second valve member off said valve seat when the pressure of said source and in said container increases to a critical value, said means comprising a leaf spring, means for centrally securing said second valve member to said leaf spring and for adjusting it to different distances therefrom, means for securing the ends of said leaf spring in a fixed position relative to said container, means for exerting equal pressures upon each end of said leaf spring in the direction toward the other end so as normally to bend said spring centrally between said ends in the direction toward said valve seat and thereby to press said second valve member upon said valve seat to close the same with a pressure at least slightly greater than the normal pressure of said source acting in said container upon said diaphragm so that, when the pressure of said source increases above said normal value, said diaphragm and the first valve member thereon are moved by said increased pressure in the direction away from said container bottom and in turn move the second valve member and bend the leaf spring in the same direction toward its substantially straight position from which, when said pressure of said source further increases and reaches said critical value, said leaf spring then suddenly snaps of its own accord in the same direction toward its released position and thereby pulls said second valve member off said valve seat, and means for adjusting the pressure upon the ends of said leaf spring in accordance with said critical pressure at which said valve should open.

4. A pressure control valve comprising a substantially U-shaped bracket having a central web and a pair of substantially parallel arms thereon, said central web having a central aperture, a cup-shaped container having an outer wall and a bottom, and a central inlet port in said bottom, a pipe extending through said aperture and connected to said central web and having one end connected to said inlet port and another end adapted to be connected to a source of pressure to be controlled by said valve, a diaphragm secured at its outer edge to the free end of said container wall and having a central aperture, a ring-shaped first valve member within said last aperture and secured to the inner edge of said diaphragm defining said last aperture, one end of said first valve member on the outer side of said diaphragm forming an annular valve seat and the other end of said first valve member normally adapted to engage upon the bottom of said container, the wall of said valve member having at least one port for connecting the inside of said container with said inlet port, a second valve member operatively associated with said first valve member and normally engaging with and covering said valve seat and thereby closing said container toward the atmosphere, and means for normally maintaining said second valve member in closing engagement with said valve seat on said first valve member and for suddenly lifting said second valve member off said valve seat when the pressure of said source and in said container increases to a critical value, said means comprising a leaf spring extending transversely between said bracket arms and its ends connected to said arms at equal distances from said container, means for connecting said second valve member to the center of said leaf spring, and adjusting means connecting said bracket arms to each other above said container for drawing them toward each other so as to exert equal pressures upon each end of said leaf spring in the direction toward the other end so as normally to bend said spring centrally between said ends in the direction toward said valve seat and thereby to press said second valve member upon said valve seat to close the same with a pressure at least slightly greater than the normal pressure of said source acting in said container upon said diaphragm so that, when the pressure of said source increases above said normal value, said diaphragm and the first valve member thereon are moved by said increased pressure in the direction away from said container bottom and in turn move the second valve member and bend the leaf spring in the same direction toward its substantially straight position from which, when said pressure of said source further increases and reaches said critical value, said leaf spring then suddenly snaps of its own accord in the same direction toward its released position and thereby pulls said second valve member off said valve seat.

5. A pressure control valve as defined in claim 1, further comprising additional control means, and means on said leaf spring for actuating said control means when said spring snaps toward its released position.

6. A pressure control valve as defined in claim 1, further comprising an electric switch, and means on said leaf spring for actuating said switch when said spring snaps toward its released position.

7. A pressure control valve as defined in claim 1, in which said means for connecting said second valve member to said leaf spring comprise a screw extending through a central bore in said spring and centrally secured at one end to said second valve member, and a pair of nuts on said screw at both sides of and engaging with said spring and having arcuate surfaces facing said spring.

8. A pressure control valve as defined in claim 1, further comprising a coil spring in said container acting upon said diaphragm and tending to press said first valve member against said second valve member independently of said leaf spring when said valve is in the closed position.

References Cited by the Examiner
UNITED STATES PATENTS

| | | | |
|---|---|---|---|
| 1,921,795 | 8/1933 | Wilms | 200—83 |
| 2,921,158 | 1/1960 | Taylor | 200—61.86 X |
| 3,052,259 | 9/1962 | Van Der Velden | 137—508 X |
| 3,061,138 | 10/1962 | Edelmann et al. | 137—508 X |

M. CARY NELSON, *Primary Examiner.*

H. KLINKSIEK, *Assistant Examiner.*